United States Patent [19]

Gracie

[11] Patent Number: 4,582,282

[45] Date of Patent: Apr. 15, 1986

[54] SUPPORTING STAND FOR A STRINGED MUSICAL INSTRUMENT

[76] Inventor: John D. Gracie, 7013 Pomelo Dr., Canoga Park, Calif. 91307

[21] Appl. No.: 525,153

[22] Filed: Aug. 22, 1983

Related U.S. Application Data

[63] Continuation-in-part of Ser. No. 283,229, Jul. 14, 1981.

[51] Int. Cl.[4] .............................................. F16M 11/38

[52] U.S. Cl. ...................................... 248/167; 84/327; 248/175

[58] Field of Search ............ 248/167, 175, 460, 465.2; 24/23 B, 23 W; 84/327

[56] References Cited

U.S. PATENT DOCUMENTS

| | | | |
|---|---|---|---|
| 1,357,250 | 11/1920 | Rau | 248/167 |
| 1,369,742 | 2/1921 | Halpin | 248/175 |
| 1,612,148 | 12/1926 | Oettinger | 248/460 X |
| 2,180,125 | 11/1939 | Smith | 248/167 X |
| 2,464,031 | 3/1949 | Feidel | 248/167 |
| 2,971,286 | 2/1961 | Ernest | 248/465.2 |
| 3,668,744 | 6/1972 | Moody et al. | 24/23 B |
| 3,680,820 | 8/1972 | Gracie | 248/314 |
| 3,958,786 | 5/1976 | Mann | 248/460 |
| 4,060,216 | 11/1977 | Million | 248/460 |
| 4,099,441 | 7/1978 | Landon | 84/327 |
| 4,214,724 | 7/1980 | Geiger | 248/167 |
| 4,352,480 | 10/1982 | Gathright | 248/460 X |

FOREIGN PATENT DOCUMENTS

| | | | |
|---|---|---|---|
| 1518849 | 2/1968 | France | 248/167 |
| 24561 | 10/1913 | United Kingdom | 248/167 |
| 1273155 | 5/1972 | United Kingdom | 248/460 |

*Primary Examiner*—J. Franklin Foss
*Assistant Examiner*—David L. Talbott
*Attorney, Agent, or Firm*—Jack C. Munro

[57] ABSTRACT

A free-standing supporting stand for a sound box musical instrument which takes the form of a pair of rod-like front legs and a rod-like rear leg which are to rest as a tripod on a supporting surface. The front legs and rear leg are held together by a clamping band. The rear leg is fixed relative to the clamping band. The front legs are pivotable in respect to the rear leg between a collapsed position in substantial juxtaposition with the rear leg to an extended position to facilitate connection with the sound box of the musical instrument.

10 Claims, 6 Drawing Figures

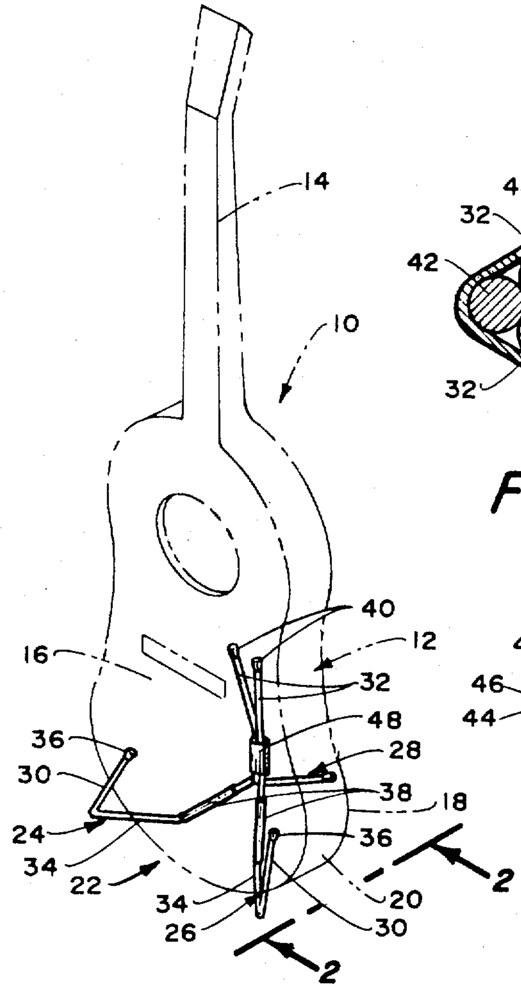
Fig. 1.
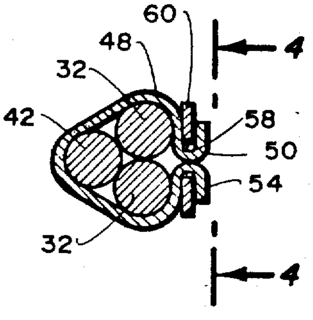
Fig. 3.
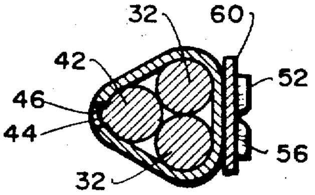
Fig. 5.
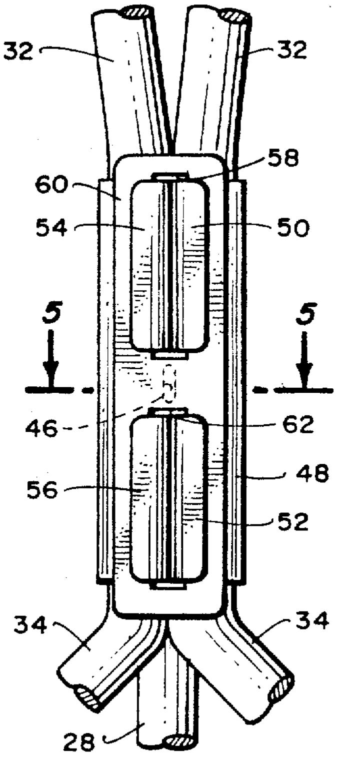
Fig. 4.
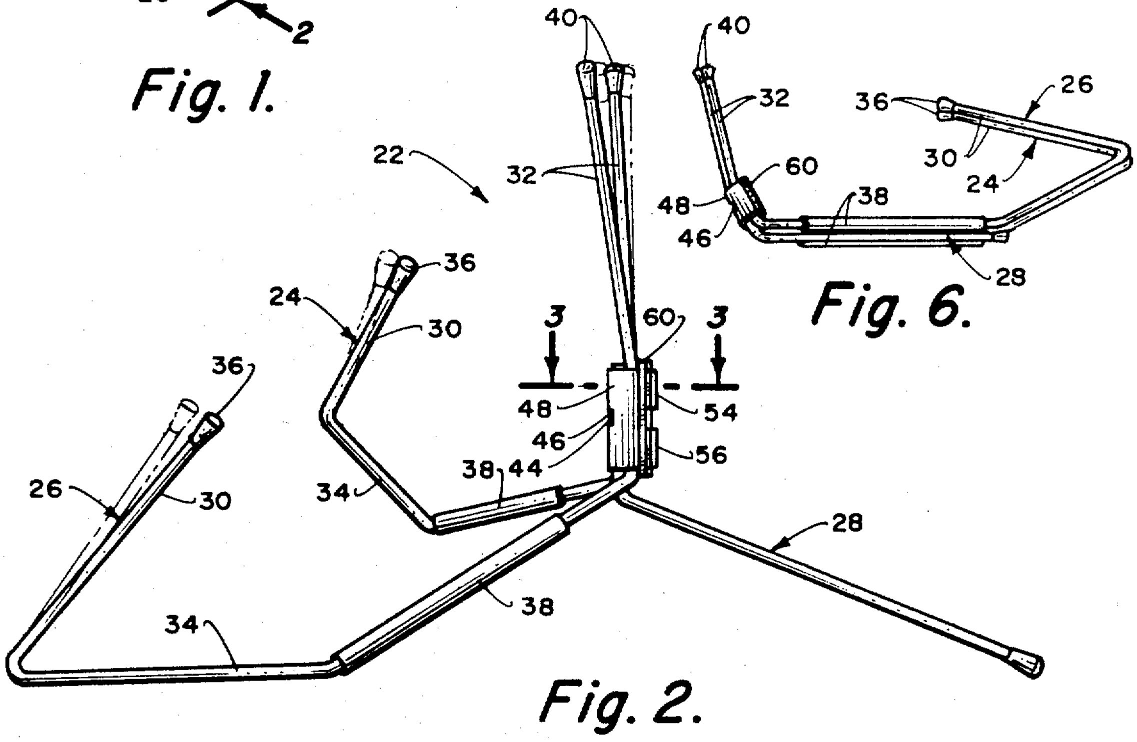
Fig. 6.
Fig. 2.

SUPPORTING STAND FOR A STRINGED MUSICAL INSTRUMENT

REFERENCE TO PRIOR APPLICATION

The subject patent application is a continuation-in-part of a patent application Ser. No. 238,229, filed July 14, 1981, entitled FOLDING TRIPOD GUITAR STAND, by the present inventor.

BACKGROUND OF THE INVENTION

The field of this invention generally relates to a supporting stand and more particularly to a supporting stand for use in connection with a sound box type of musical instrument.

A performer with a guitar or other sound box type of musical instrument will highly value that instrument as that instrument is not only expensive but is necessary for producing a desired sound for the particular performer.

Performing musicians, when not performing, frequently locate their guitar on a chair or other supporting surface. Such mere locating of an instrument on a supporting surface is potentially hazardous to the musical instrument as the musical instrument could be bumped or otherwise fall from the supporting surface which could cause irreparable damage to the instrument.

Also, some musicians during a performance may use a plurality of different types of guitars or other similar sound box musical instruments. Therefore, it is not desirable to have the not being used instrument just barely located on a table or other supporting surface since the musician may need to rapidly disengage himself from one musical instrument and locate the other musical instrument quickly in his grasp in order to continue a particular performance.

Also, within commercial establishments that sell musical instruments, it is desirable that the guitars and other sound box musical instruments be supported in an eye catching manner to facilitate their sale. It has been found that a desirable eye catching manner would be to have the musical instrument upright with the neck of the—guitar substantially vertically oriented. Also such supporting of a guitar, when the guitar is not being used, in conjunction with a performance has also been found to be desirable.

Within the past there have been attempts to design supporting stands for supporting a guitar in the upright manner. Such supporting stands are normally constructed as a solid rigid unit with the guitar primarily resting within the supporting stand. The guitar will be located in a slightly loose fit in conjunction with the stand. It has been found that if the guitar is accidently bumped while in such a supporting stand, that possibly the guitar would be capable of falling free from the stand and therefore possibly incurring damage.

Also, such rigid stands have been found to occupy a substantial amount of space. A performer frequently travels from one location to another and therefore requires to transport the stand separate from its musical instrument. This means that the performer has additional equipment that must be transported.

Further, within a commercial establishment there may be used one, two, three or more dozen of such stands. If a few of the stands are not being used these stands can occupy significant amount of space within the store when they are stored. Within the aforementioned patent application of which the present invention is continuation-in-part, there was disclosed a supporting stand for a guitar or other similar sound box musical instrument which collapsed, to occupy a small amount of space when not in use. This would be desirable as the stand could be included right within the guitar carrying case and did not require to be carried separately by the musician when moving from one location to another. Also, within a commercial establishment the guitar stand could be readily located within a drawer or other similar type of storage space when not in use. Additionally, the guitar stand resiliently connected itself to the sound box of the muscial instrument so, that during the time that the musical instrument was supported, there would be a secure connection between the musical instrument and the stand, making it almost impossible to separate the musical instrument from the stand by merely bumping the musical instrument. It was necessary to overtly remove the musical instrument from the stand when such is desired.

Within the stand of the aforementioned continuation-in-part patent application, all three legs were pivotable in respect to a clamping band which held the legs together. During folding of the stand in the collapsed position, it has been found to be desirable to fix in position, with respect to clamping band, one of the legs and have the other two legs be pivotable in respect to the band. Also, the clamping band of the aforementioned application was not constructed in a manner to facilitate manufacture of the supporting stand. Further, the clamping band of the aforementioned application did not achieve the most desired connection between the legs.

SUMMARY OF THE INVENTION

The supporting stand of the present invention utilizes a pair of identical front legs which are pivotably movable in respect to a clamping band which connects the front legs to a rear leg. Each of the front legs have rear sections which are to be in contact with the rear wall of the sound box of the musical instrument. Each of the front legs also have fore sections which are to be in contact with the front wall of the sound box of the musical instrument. The bottom edge of the musical instrument is to be in direct contact with the intermediate sections of the front legs. With the sound box installed in position within the supporting stand, the fore sections of the front legs are biased outwardly in respect to the rear sections creating a slight holding force securing the sound box of the musical instrument to the supporting stand. When the supporting stand is in the collapsed position, the rear leg and the front legs are in juxtaposition. The rear leg includes a protuberance which is to be located within an opening of the clamping band which prevents relative movement there between. The front legs are freely pivotable in respect to the clamping band. Free ends of the clamping band are formed into a plurality of deformable flanges. The deformable flanges are to connect with a pair of openings formed within a plate. Upon the flanges being deformed against the plate, a snug connection between the clamping band occurs binding the legs together.

BRIEF DESCRIPTION OF THE DRAWING

FIG. 1 is an isometric view showing the supporting stand of the present invention in its extended-usable position showing a typical guitar in phantom mounted in conjunction with the supporting stand;

FIG. 2 is a side, elevational view of the supporting stand of the present invention taken along line 2—2 FIG. 1;

FIG. 3 is a cross-sectional view showing in more detail the clamping band arrangement used in conjunction with the supporting stand of the present invention taken along line 3—3 of FIG. 2;

FIG. 4 is a back, elevational view of the clamping band utilized in conjunction with the supporting stand of the present invention taken along line 4—4 of FIG. 3;

FIG. 5 is a cross-sectional view similar to FIG. 3 taken along line 5—5 of FIG. 4; and FIG. 6 is a side, elevational view of the supporting stand in the collapsed position.

DETAILED DESCRIPTION OF THE SHOWN EMBODIMENT

Referring particularly to the drawing there is shown a conventional guitar 10 which has a sound box 12 and a neck 14. The sound box 12 has a front wall 16 and a back wall 18 which are connected together through a side wall 20. The supporting stand 22 of the present invention is to be utilized to support a guitar 10 in the vertically oriented position as shown within FIG. 1.

The supporting stand 22 is composed generally of a pair of identical front legs 24 and 26 and a rear leg 28. Each front leg 24 and 26 includes a fore section 30 and a rear section 32. The fore section 30 of each leg 24 and 26 is connected to the rear section 32 by means of an intermediate section 34. It is understood that each of the legs 24 and 26 as well as the rear leg 28 are to be constructed of rigid cylindrical rods of about one-quarter inch in diameter.

Each fore section 30 forms an acute angle with its respective intermediate section 34. The outer extremity of each fore section 30 terminates in a rubber or plastic tip 36. The tip 36 is to be in contact with the surface of the front wall 16. It is the function of the tips 36 to prevent marring or otherwise damage to the sound box 12.

Each intermediate section 34 includes a horizontal section which is adapted to press flush against a floor or other supporting surface (not shown). Extending from the horizontal portion of the intermediate section 34 is an inclined section which has mounted thereon a protective sleeve 38. Each protective sleeve 38 will normally be constructed of a rubber or plastic material. The edge of the sound box 12 connecting the side wall 20 to the back wall 18 is to rest against the sleeves 38. It is the function of the sleeves 38 to also prevent marring or other damage to the sound box 12.

The rear sections 32 terminate also in rubber or plastic tips 40. It is the function of the tips 40, which are in contact with the back wall 18, to prevent scarring of such.

The rear leg 28 terminates in an inner end 42. The inner end 42 has extending exteriorly therefrom a protuberance 44. The protuberance 44 is to rest within a connecting opening 46 of a section of sheet material known as a clamping band 48. The side edges of the clamping band 48 terminates into deformable flanges 50, 52, 54 and 56. The flanges 50 and 52 are located on one side of the clamping band 48 with the flanges 54 and 56 located on the opposite side of the clamping band 48.

The clamping band 48 is to tightly encase the inner end 42 of the rear leg 28 and the rear sections 32 of the front legs 24 and 26. The flanges 50 and 54 extend through a large opening 58 formed within a clamping plate 60. The flanges 52 and 56 also extend through an identical sized opening 62 formed within the plate 60. The flanges 50, 52, 54 and 56 are then deformed against the exterior surface of the plate 60 so the clamping band 48 functions to snugly hold together the rear sections 30, 32 to the inner end 42.

The reason that two separate openings 58 and 62 are utilized is so that the force supplied by the clamping band 48 will be evenly distributed along the longitudinal length of rear sections 32 and the inner end 42. If a single enlarged opening was substituted for the separate openings 58 and 62, there would be a natural tendency for a "bowing" to occur along the longitudinal length diminishing the positive connection.

It is to be noted that because of the protuberance 44 being located within the connecting opening 46 that the inner end 42 is fixedly secured relative to clamping band 48. It is also to be noted that each of the legs 24 and 26 are pivotable in respect to the clamping band 48 from the extended-usable position shown in FIGS. 1 and 2 to a retracted-storage position. In the retracted-storage position the legs 24 and 26 are located side by side or in juxtaposition. Also the rear leg 20 is in juxtaposition with the folded legs 24 and 26.

What is claimed is:

1. In combination with a stringed musical instrument having a sound box having a front wall and rear wall connected together by a side wall assembly, a supporting stand to be located on a supporting surface comprising:

a rigid rod leg assembly composed of a pair of front legs and a rear leg, each said front leg being substantially identical in configuration, each said front leg defining a fore section and a rear section connected together with an intermediate section; and clamping means clamping together said front legs and said rear leg, said front legs being pivotable in respect to said clamping means between an extended-usable position and a collapsed-storage position, with said front legs in said exterior-usable position said fore section of each said front leg being in contact with said front wall and said rear sections being in contact with said rear wall and said rear leg and said intermediate sections being in contact with said supporting surface, with said front legs in said collapsed-storage position said front legs being in substantial juxtaposition with said rear leg.

2. The combination defined in claim 1 wherein:

said extended usable position comprising a tripod configuration.

3. The combination as defined in claim 2 wherein:

when said front legs are in said extended usable position the said fore sections being spread apart from said rear sections thereby creating a holding force securing said supporting stand to said sound box.

4. The combination as defined in claim 3 wherein:

said clamping means comprising a clamping plate and a clamping band, said clamping plate having a pair of spaced apart openings, said clamping band having a plurality of bendable flanges, said bendable flanges to extend through said spaced apart openings and are then to be deformed to securely bind together said rear leg and said front legs in the confines of a enclosed area defined by said clamping band.

5. The combination as defined in claim 4 wherein:

said rear leg including a protuberance, said clamping band including a connecting opening, said protuberance to be located within said connecting opening preventing pivotable movement of said rear leg relative to said clamping band.

6. The combination as defined in claim 5 wherein: said clamping band being located about said rear sections directly adjacent the point of connection of said rear sections to their respective said intermediate section.

7. The combination as defined in claim 1 wherein: said clamping means comprising a clamping plate and a clamping band, said clamping plate having a pair of spaced apart openings, said clamping band having a plurality of bendable flanges, said bendable flanges to extend through said spaced apart openings and are then to be deformed to securely bind together said rear leg and said front legs in the confines of an enclosed area defined by said clamping band.

8. The combination as defined in claim 7 wherein: said rear leg including a protuberance, said clamping band including a connecting opening, said protuberance to be located within said connecting opening preventing pivotable movement of said rear leg relative to said clamping band.

9. The combination as defined in claim 8 wherein: said clamping band being located about said rear sections directly adjacent the point of connection of said rear sections to their respective said intermediate section.

10. The combination as defined in claim 7 wherein: said clamping band being located about said rear sections directly adjacent the point of connection of said rear sections to their respective said intermediate section.

* * * * *